US009220295B2

(12) United States Patent
Morton et al.

(10) Patent No.: US 9,220,295 B2
(45) Date of Patent: Dec. 29, 2015

(54) TOBACCO SEPARATION PROCESS FOR EXTRACTING TOBACCO-DERIVED MATERIALS, AND ASSOCIATED EXTRACTION SYSTEMS

(75) Inventors: Joshua D. Morton, Evansville, IN (US); Steven D. Hume, Owensboro, KY (US); Barry Bratcher, Owensboro, KY (US)

(73) Assignee: R.J. Reynolds Tobacco Company, Winston-Salem, NC (US)

( * ) Notice: Subject to any disclaimer, the term of this patent is extended or adjusted under 35 U.S.C. 154(b) by 1314 days.

(21) Appl. No.: 13/072,019

(22) Filed: Mar. 25, 2011

(65) Prior Publication Data

US 2012/0141648 A1 Jun. 7, 2012

Related U.S. Application Data

(63) Continuation-in-part of application No. 12/957,821, filed on Dec. 1, 2010.

(51) Int. Cl.
| | |
|---|---|
| *C08B 30/00* | (2006.01) |
| *C08B 30/04* | (2006.01) |
| *C08B 37/06* | (2006.01) |
| *C08B 15/00* | (2006.01) |
| *A23L 1/0522* | (2006.01) |
| *C07K 14/415* | (2006.01) |
| *B02C 19/00* | (2006.01) |

(Continued)

(52) U.S. Cl.
CPC . *A24B 15/12* (2013.01); *A23G 3/48* (2013.01); *A24B 15/24* (2013.01); *A24B 15/30* (2013.01)

(58) Field of Classification Search
CPC .............................. A24B 15/24; A24B 15/241
See application file for complete search history.

(56) References Cited

U.S. PATENT DOCUMENTS

| 1,376,586 A | 5/1921 | Schwartz | |
|---|---|---|---|
| 2,609,326 A * | 9/1952 | Pigman et al. | 106/206.1 |

(Continued)

FOREIGN PATENT DOCUMENTS

| WO | WO 2004/095959 | 11/2004 |
|---|---|---|
| WO | WO 2008/103935 A2 | 8/2008 |
| WO | WO 2010/132444 A2 | 11/2010 |

OTHER PUBLICATIONS

Samuel Wildman, "An Alternate use for tobacco Agriculture:Proteins for Food Plus a Safer Smiking Material" from Plants: The Potentials for Extracting Protein, Medicines, and Other Useful chemicals-workshop proceedings (Washington, D.C.,: U.S. Congress, Office of technology Assesment, OTA-BP-F-23, Sep. 1983), pp. 63-77.*

(Continued)

*Primary Examiner* — Jason L Lazorcik
(74) *Attorney, Agent, or Firm* — Womble Carlyle Sandridge & Rice, LLP (57) ABSTRACT

A process of extracting at least one target component from a plant material is provided. The process includes homogenizing a plant material in the presence of an extraction solvent to reduce the plant material to a plant liquid component and a plant pulp component. Each of the components may be further processed to extract specific components therefrom. Specifically, the plant liquid component can be processed to extract a plant-derived starch material, plant-derived proteins, plant-derived sugars, plant-derived sugars, and the like. The plant pulp material can be processed to extract pectin and cellulose. An associated system is also provided.

33 Claims, 4 Drawing Sheets

(51) Int. Cl.
*A24B 15/12* (2006.01)
*A23G 3/48* (2006.01)
*A24B 15/24* (2006.01)
*A24B 15/30* (2006.01)

(56) References Cited

U.S. PATENT DOCUMENTS

| | | | |
|---|---|---|---|
| 3,098,492 A | 7/1963 | Wurzburg et al. | |
| 3,696,917 A | 10/1972 | Levi | |
| 3,806,617 A | 4/1974 | Smylie | |
| 4,144,895 A | 3/1979 | Fiore | |
| 4,148,325 A | 4/1979 | Solomon et al. | |
| 4,150,677 A | 4/1979 | Osborne, Jr. et al. | |
| 4,267,847 A | 5/1981 | Reid | |
| 4,268,632 A * | 5/1981 | Wildman et al. | 435/232 |
| 4,289,147 A * | 9/1981 | Wildman et al. | 131/290 |
| 4,347,324 A * | 8/1982 | Wildman et al. | 435/232 |
| 4,351,346 A | 9/1982 | Brummer et al. | |
| 4,359,059 A | 11/1982 | Brummer et al. | |
| 4,506,682 A | 3/1985 | Muller | |
| 4,513,756 A | 4/1985 | Pittman et al. | |
| 4,528,993 A | 7/1985 | Sensabaugh, Jr. et al. | |
| 4,589,428 A * | 5/1986 | Keritsis | 131/297 |
| 4,605,016 A | 8/1986 | Soga et al. | |
| 4,624,269 A | 11/1986 | Story et al. | |
| 4,660,577 A | 4/1987 | Sensabaugh et al. | |
| 4,716,911 A | 1/1988 | Poulose et al. | |
| 4,725,440 A | 2/1988 | Ridgway et al. | |
| 4,727,889 A | 3/1988 | Niven, Jr. et al. | |
| 4,874,000 A | 10/1989 | Tamoi et al. | |
| 4,880,018 A | 11/1989 | Graves, Jr. et al. | |
| 4,887,618 A | 12/1989 | Bernasek et al. | |
| 4,941,484 A | 7/1990 | Clapp et al. | |
| 4,967,771 A | 11/1990 | Fagg et al. | |
| 4,986,286 A | 1/1991 | Roberts et al. | |
| 4,987,907 A | 1/1991 | Townend | |
| 4,989,620 A | 2/1991 | Keritsis et al. | |
| 4,991,599 A | 2/1991 | Tibbetts | |
| 5,005,593 A | 4/1991 | Fagg | |
| 5,018,540 A | 5/1991 | Grubbs et al. | |
| 5,060,669 A | 10/1991 | White et al. | |
| 5,065,775 A | 11/1991 | Fagg | |
| 5,072,744 A | 12/1991 | Luke et al. | |
| 5,074,319 A | 12/1991 | White et al. | |
| 5,092,352 A | 3/1992 | Sprinkle, III et al. | |
| 5,099,862 A | 3/1992 | White et al. | |
| 5,121,757 A | 6/1992 | White et al. | |
| 5,131,414 A | 7/1992 | Fagg et al. | |
| 5,131,415 A | 7/1992 | Munoz et al. | |
| 5,148,819 A | 9/1992 | Fagg | |
| 5,197,494 A | 3/1993 | Kramer | |
| 5,230,354 A | 7/1993 | Smith et al. | |
| 5,234,008 A | 8/1993 | Fagg | |
| 5,243,999 A | 9/1993 | Smith | |
| 5,301,694 A | 4/1994 | Raymond et al. | |
| 5,318,050 A | 6/1994 | Gonzalez-Parra et al. | |
| 5,343,879 A | 9/1994 | Teague | |
| 5,360,022 A | 11/1994 | Newton et al. | |
| 5,387,416 A | 2/1995 | White et al. | |
| 5,435,325 A | 7/1995 | Clapp et al. | |
| 5,445,169 A | 8/1995 | Brinkley et al. | |
| 5,539,093 A | 7/1996 | Fitzmaurice et al. | |
| 5,668,295 A | 9/1997 | Wahab et al. | |
| 5,705,624 A | 1/1998 | Fitzmaurice et al. | |
| 5,829,453 A | 11/1998 | White et al. | |
| 5,844,119 A | 12/1998 | Weigl | |
| 6,077,524 A | 6/2000 | Bolder et al. | |
| 6,131,584 A | 10/2000 | Lauterbach | |
| 6,182,670 B1 | 2/2001 | White et al. | |
| 6,284,875 B1 | 9/2001 | Trpen et al. | |
| 6,298,859 B1 | 10/2001 | Kierulff et al. | |
| 6,510,855 B1 | 1/2003 | Korte et al. | |
| 6,668,839 B2 | 12/2003 | Williams | |
| 6,730,832 B1 | 5/2004 | Dominguez et al. | |
| 6,772,767 B2 | 8/2004 | Mua et al. | |
| 6,817,970 B2 | 11/2004 | Berit et al. | |
| 6,834,654 B2 | 12/2004 | Williams | |
| 6,895,974 B2 | 5/2005 | Peele | |
| 6,906,172 B2 * | 6/2005 | Bratcher et al. | 530/344 |
| 6,953,040 B2 | 10/2005 | Atchley et al. | |
| 7,014,039 B2 | 3/2006 | Henson et al. | |
| 7,025,066 B2 | 4/2006 | Lawson et al. | |
| 7,032,601 B2 | 4/2006 | Atchley et al. | |
| 7,034,128 B2 | 4/2006 | Turpen et al. | |
| 7,048,211 B2 * | 5/2006 | Bratcher et al. | 241/2 |
| 7,173,170 B2 | 2/2007 | Liu et al. | |
| 7,208,659 B2 | 4/2007 | Colliver et al. | |
| 7,230,160 B2 | 6/2007 | Benning et al. | |
| 7,337,782 B2 | 3/2008 | Thompson | |
| D592,956 S | 5/2009 | Thiellier | |
| 7,537,110 B2 | 5/2009 | Kutsch et al. | |
| D594,154 S | 6/2009 | Patel et al. | |
| 7,584,843 B2 | 9/2009 | Kutsch et al. | |
| 7,650,892 B1 | 1/2010 | Groves et al. | |
| 7,694,686 B2 | 4/2010 | Atchley et al. | |
| 2002/0138207 A1 * | 9/2002 | Bratcher et al. | 702/22 |
| 2004/0020503 A1 | 2/2004 | Williams | |
| 2004/0166026 A1 * | 8/2004 | Bratcher et al. | 422/99 |
| 2005/0115580 A1 | 6/2005 | Quinter et al. | |
| 2005/0244521 A1 | 11/2005 | Strickland et al. | |
| 2006/0037623 A1 | 2/2006 | Lawrence, Jr. | |
| 2006/0191548 A1 | 8/2006 | Strickland et al. | |
| 2006/0236434 A1 | 10/2006 | Conkling et al. | |
| 2006/0288449 A1 * | 12/2006 | Garger et al. | 800/280 |
| 2007/0062549 A1 | 3/2007 | Holton, Jr. et al. | |
| 2007/0186941 A1 | 8/2007 | Holton, Jr. et al. | |
| 2007/0186942 A1 | 8/2007 | Strickland et al. | |
| 2008/0029110 A1 | 2/2008 | Dube et al. | |
| 2008/0029116 A1 | 2/2008 | Robinson et al. | |
| 2008/0029117 A1 | 2/2008 | Mua et al. | |
| 2008/0173317 A1 | 7/2008 | Robinson et al. | |
| 2008/0196730 A1 | 8/2008 | Engstrom et al. | |
| 2008/0209586 A1 | 8/2008 | Nielsen et al. | |
| 2008/0245377 A1 | 10/2008 | Marsahall et al. | |
| 2008/0305216 A1 | 12/2008 | Crawford et al. | |
| 2009/0014343 A1 | 1/2009 | Clark et al. | |
| 2009/0014450 A1 | 1/2009 | Bjorkholm | |
| 2009/0025738 A1 | 1/2009 | Mua et al. | |
| 2009/0025739 A1 | 1/2009 | Brinkley et al. | |
| 2009/0065013 A1 | 3/2009 | Essen et al. | |
| 2009/0223989 A1 | 9/2009 | Gelardi | |
| 2009/0230003 A1 | 9/2009 | Thiellier | |
| 2009/0250360 A1 | 10/2009 | Bellamah et al. | |
| 2009/0266837 A1 | 10/2009 | Gelardi et al. | |
| 2009/0293889 A1 | 12/2009 | Kumar et al. | |
| 2010/0084424 A1 | 4/2010 | Gelardi | |
| 2010/0133140 A1 | 6/2010 | Bailey | |
| 2010/0291245 A1 | 11/2010 | Gao et al. | |
| 2010/0300464 A1 | 12/2010 | Gee et al. | |
| 2010/0303969 A1 | 12/2010 | Sengupta et al. | |

OTHER PUBLICATIONS

Chang, "Isolation and Purification of Leaf Starch Components," *Plant Phsiol.*, 1979, pp. 833-836, vol. 64.

Carpita, et al., "Extraction of Starch by Dimethyl Sulfoxide and Quantitation by Enzymatic Assay," *Analytical Biochemistry*, 1987, 132-139, vol. 161.

Danebowe, et al. "Tobacco as a Biochemical Resource: Past, Present, and Future" Biologically Active Natural Products: Agrochemicals, pp. 155-168.

De Roton et al. "Factors Influencing the Formation of Tobacco-Specific Nitrosamines in French Air-Cured Tobacco in Trials and at the Farm Level", Beitrage zur Tabakforschung International/Contributions to Tobacco Research, Jul. 2005, pp. 305-320, vol. 21 No. 6.

Nestor, et al. "Role of Oxides of Nitrogen in Tobacco-Specific Nitrosamine Formation in Flue-Cured Tobacco", Beitrage zur Tabakforschung International/Contributions to Tobacco Research, Nov. 2003, pp. 467-475, vol. 20 No. 7.

Staaf et al. "Formation of Tobacco-Specific Nitrosamines (TSNA) During Air-Curing: Conditions and Control" , Beitrage zur (56) References Cited

OTHER PUBLICATIONS

Tabakforschung International/Contributions to Tobacco Research Jul. 2005, pp. 321-330, vol. 21 No. 6.

* cited by examiner

TOBACCO SEPARATION PROCESS FOR EXTRACTING TOBACCO-DERIVED MATERIALS, AND ASSOCIATED EXTRACTION SYSTEMS

CROSS-REFERENCE TO RELATED APPLICATIONS

This application is a continuation-in-part of U.S. patent application Ser. No. 12/957,821, filed Dec. 1, 2010, which is hereby incorporated herein by reference in its entirety.

FIELD OF THE DISCLOSURE

The present disclosure relates to the extraction of components from a plant material, and particularly for the extraction of one or more components of a tobacco plant material. The disclosure further relates to plant-derived components useful in various products, particularly products made or derived from tobacco, or that otherwise incorporate tobacco, and are intended for human consumption.

BACKGROUND OF THE DISCLOSURE

Cigarettes, cigars, and pipes are popular smoking articles that employ tobacco in various forms. Such smoking articles are employed by heating or burning tobacco to generate aerosol (e.g., smoke) that may be inhaled by the smoker. Tobacco may also be enjoyed in a so-called "smokeless" form. Particularly popular smokeless tobacco products are employed by inserting some form of processed tobacco or tobacco-containing formulation into the mouth of the user. See for example, the types of smokeless tobacco formulations, ingredients, and processing methodologies set forth in U.S. Pat. No. 1,376,586 to Schwartz; U.S. Pat. No. 3,696,917 to Levi; U.S. Pat. No. 4,513,756 to Pittman et al.; U.S. Pat. No. 4,528,993 to Sensabaugh, Jr. et al.; U.S. Pat. No. 4,624,269 to Story et al.; U.S. Pat. No. 4,991,599 to Tibbetts; U.S. Pat. No. 4,987,907 to Townsend; U.S. Pat. No. 5,092,352 to Sprinkle, III et al.; U.S. Pat. No. 5,387,416 to White et al.; U.S. Pat. No. 6,668,839 to Williams; U.S. Pat. No. 6,834,654 to Williams; U.S. Pat. No. 6,953,040 to Atchley et al.; U.S. Pat. No. 7,032,601 to Atchley et al.; and U.S. Pat. No. 7,694,686 to Atchley et al.; US Pat. Pub. Nos. 2004/0020503 to Williams; 2005/0115580 to Quinter et al.; 2005/0244521 to Strickland et al.; 2006/0191548 to Strickland et al.; 2007/0062549 to Holton, Jr. et al.; 2007/0186941 to Holton, Jr. et al.; 2007/0186942 to Strickland et al.; 2008/0029110 to Dube et al.; 2008/0029116 to Robinson et al.; 2008/0029117 to Mua et al.; 2008/0173317 to Robinson et al.; 2008/0196730 to Engstrom et al.; 2008/0209586 to Neilsen et al.; 2008/0305216 to Crawford et al.; 2009/0065013 to Essen et al.; 2009/0293889 to Kumar et al.; and 2010/0291245 to Gao et al.; PCT WO 04/095959 to Arnarp et al.; and WO 2010/132444 A2 to Atchley; and U.S. patent application Ser. No. 12/638,394, filed Dec. 15, 2009, to Mua et al.; each of which is incorporated herein by reference.

Exemplary smokeless tobacco products that have been marketed include those referred to as CAMEL Snus, CAMEL Orbs, CAMEL Strips and CAMEL Sticks by R. J. Reynolds Tobacco Company; GRIZZLY moist tobacco, KODIAK moist tobacco, LEVI GARRETT loose tobacco and TAYLOR'S PRIDE loose tobacco by American Snuff Company, LLC; KAYAK moist snuff and CHATTANOOGA CHEW chewing tobacco by Swisher International, Inc.; REDMAN chewing tobacco by Pinkerton Tobacco Co. LP; COPENHAGEN moist tobacco, COPENHAGEN Pouches, SKOAL Bandits, SKOAL Pouches, RED SEAL long cut and REVEL Mint Tobacco Packs by U.S. Smokeless Tobacco Company; and MARLBORO Snus and Taboka by Philip Morris USA.

In some instances, at least a portion of a tobacco material employed in the smokeless tobacco composition or product can have the form of an extract. The tobacco extract can be employed in a variety of forms. For example, the tobacco extract can be isolated in an essentially solvent free form or in a liquid form. Exemplary techniques for extracting components of tobacco are described in U.S. Pat. No. 4,144,895 to Fiore; U.S. Pat. No. 4,150,677 to Osborne, Jr. et al.; U.S. Pat. No. 4,267,847 to Reid; U.S. Pat. No. 4,289,147 to Wildman et al.; U.S. Pat. No. 4,351,346 to Brummer et al.; U.S. Pat. No. 4,359,059 to Brummer et al.; U.S. Pat. No. 4,506,682 to Muller; U.S. Pat. No. 4,589,428 to Keritsis; U.S. Pat. No. 4,605,016 to Soga et al.; U.S. Pat. No. 4,716,911 to Poulose et al.; U.S. Pat. No. 4,727,889 to Niven, Jr. et al.; U.S. Pat. No. 4,887,618 to Bernasek et al.; U.S. Pat. No. 4,941,484 to Clapp et al.; U.S. Pat. No. 4,967,771 to Fagg et al.; U.S. Pat. No. 4,986,286 to Roberts et al.; U.S. Pat. No. 5,005,593 to Fagg et al.; U.S. Pat. No. 5,018,540 to Grubbs et al.; U.S. Pat. No. 5,060,669 to White et al.; U.S. Pat. No. 5,065,775 to Fagg; U.S. Pat. No. 5,074,319 to White et al.; U.S. Pat. No. 5,099,862 to White et al.; U.S. Pat. No. 5,121,757 to White et al.; U.S. Pat. No. 5,131,414 to Fagg; U.S. Pat. No. 5,131,415 to Munoz et al.; U.S. Pat. No. 5,148,819 to Fagg; U.S. Pat. No. 5,197,494 to Kramer; U.S. Pat. No. 5,230,354 to Smith et al.; U.S. Pat. No. 5,234,008 to Fagg; U.S. Pat. No. 5,243,999 to Smith; U.S. Pat. No. 5,301,694 to Raymond et al.; U.S. Pat. No. 5,318,050 to Gonzalez-Parra et al.; U.S. Pat. No. 5,343,879 to Teague; U.S. Pat. No. 5,360,022 to Newton; U.S. Pat. No. 5,435,325 to Clapp et al.; U.S. Pat. No. 5,445,169 to Brinkley et al.; U.S. Pat. No. 6,131,584 to Lauterbach; U.S. Pat. No. 6,284,875 to Turpen et al.; U.S. Pat. No. 6,298,859 to Kierulff et al.; U.S. Pat. No. 6,772,767 to Mua et al.; U.S. Pat. No. 6,817,970 to Berit et al.; U.S. Pat. No. 6,906,172 to Bratcher et al.; U.S. Pat. No. 7,034,128 to Turpen et al.; U.S. Pat. No. 7,048,211 to Bratcher et al.; and U.S. Pat. No. 7,337,782 to Thompson, all of which are incorporated by reference herein.

It would be desirable to provide a process for extracting components from a plant material, such as, for example, a tobacco plant material, for use in a product, particularly a tobacco-related product, such as a smokeless tobacco product, and to provide systems for separating plant-derived components suitable for use in products, such as tobacco-related products.

SUMMARY OF THE DISCLOSURE

The present disclosure relates to a process of extracting at least one target component from a plant material. According to one embodiment, the plant material can comprise a tobacco plant material.

In some embodiments the invention generally provides a series of process steps, one or more of which may be omitted depending upon the desired product to be extracted. For example, a plant material can be homogenized in the presence of an extraction solvent (e.g., at a ratio of about 0.1 L to about 1 L of solvent per kg of plant material) to form a combination of a plant liquid component and a plant pulp component. The extraction solvent can comprise a buffer solution. More particularly, the extraction solvent can comprise one or more compounds selected from the group consisting of salts of phosphoric acid, bisulfite containing compounds, metabisulfite containing compounds, Group I and Group II halide salts, and combinations thereof. The plant liquid component can be provided with a pH in a defined range (e.g., about 6.5 to about 8.0). The plant liquid component can be withdrawn from the plant pulp component, which can be dried and further processed to separate pectin from the plant fiber (e.g., cellulose).

The plant liquid component can be processed (e.g., by centrifugation) to separate it into a solids fraction and a soluble fraction. In specific embodiments, at least about 40% by weight of the solids fraction on a dry weight basis can be a plant-derived starch component.

The solids fraction can be dried, preferably to a moisture content of less than about 10% by weight. The dried solids fraction can be milled to achieve a desired particle size, such as about an average particle size of about 50 µm to about 1 mm. Plant-derived starch (or other component) can be isolated from the solids fraction. For example, such isolating can comprise combining the plant-derived starch with a suitable solvent liquid mixture, heating the liquid mixture, filtering the liquid mixture to isolate the plant-derived starch, and optionally drying and/or irradiating the plant-derived starch.

The soluble fraction from the plant liquid component can be further separated into a liquid permeate component and a concentrate component (e.g., by filtration). In particular embodiments, the concentrate component can comprise particles from the soluble fraction having a size of greater than about 0.1 microns. The concentrate component can be dried to form a concentrate solids material, which can be milled to form a particulate. In some embodiments, the concentrate component can comprise one or more plant-derived component selected from the group consisting of insoluble proteins, large proteins, cell debris, and combinations thereof.

The liquid permeate component can be separated into a retentate component and an ancillary liquid permeate component. In some embodiments, the retentate component can comprise a soluble proteins component. In other embodiments, the ancillary liquid permeate component can comprise a component selected from the group consisting of sugars, peptides, alkaloids, and combinations thereof.

In specific embodiments wherein a starch material is extracted and isolated from a plant material, particularly a tobacco plant material, such starch material can be used to form a binder composition. An exemplary binder composition can comprise, based on the total weight thereof: at least about 35 dry weight percent of a tobacco-derived starch material according to claim 32; at least about 10 dry weight percent of a dietary fiber component; at least about 10 dry weight percent of an ash component; and at least about 1 dry weight percent of a sugar component.

In further embodiments, a process for extracting a plant-derived component from a plant material can comprise the following steps: homogenizing the plant material in the presence of an extraction solvent to form a combination of a plant liquid component and a plant pulp component, wherein the extraction solvent comprises one or more salts of phosphoric acid and one or more bisulfite or metabisulfite containing compounds; withdrawing the plant liquid component from the plant pulp component; separating the liquid plant component into a solids fraction and a soluble fraction; and further processing one or more of the plant pulp component, the solids fraction, and the soluble fraction to isolate the plant-derived component.

In further embodiments, such process further can comprise drying the solids fraction to a moisture content of less than about 10% by weight and milling the dried solids fraction to provide plant-derived starch particles having a defined average particle size (e.g., about 50 µm to about 1 mm). Still further, such process can comprise drying the plant pulp component and extracting therefrom a component selected from the group consisting of pectin, cellulose, and combinations thereof. The steps of further processing can comprise separating the soluble fraction into: a liquid permeate component comprising a component selected from the group consisting of a soluble proteins component, a sugar component, a peptide component, an alkaloid component, and combinations thereof; and a concentrate component comprising a component selected from the group consisting of insoluble proteins, large proteins, cell debris, and combinations thereof. Moreover, the liquid permeate component can be separated into: a retentate component comprising a soluble proteins component; and an ancillary liquid permeate component comprising a component selected from the group consisting of sugars, peptides, alkaloids, and combinations thereof.

In still further embodiments, the invention provides a system for deriving starch (or other components) from a plant material. For example, the system can comprise the following: a homogenizing apparatus configured to break down the plant material so as to form a plant liquid component and a plant pulp component, the homogenizing apparatus further being configured to receive an extraction solvent such that the solvent contacts the plant material during the breaking down thereof; a centrifuge apparatus configured to separate the plant liquid component into a starch-containing solids fraction and a soluble fraction; a drying apparatus configured to dry the starch-containing solids fraction to form a starch-containing solids component having a moisture content of less than about 10% by weight; and a milling apparatus configured to mill the starch-containing solids component to form particulate starch having an average particle size of about 50 µm to about 1 mm. One or more of the components of the system may be characterized as being in fluid communication, such as for facilitating continuous processing of the plant material. Alternatively, specific components of the system may be isolated from one another, such as for facilitating batch processing of the plant material. Further embodiments of a system according to the invention may be realized for isolating specific further components in light of the additional disclosure provided herein.

BRIEF DESCRIPTION OF THE DRAWINGS

Having thus described the present disclosure in general terms, reference will now be made to the accompanying drawings, which are not necessarily drawn to scale, and wherein:

DETAILED DESCRIPTION

The present disclosure now will be described more fully hereinafter with reference to the accompanying drawings, in which some, but not all aspects of the disclosure are shown. Indeed, this disclosure may be embodied in many different forms and should not be construed as limited to the aspects set forth herein; rather, these aspects are provided so that this disclosure will satisfy applicable legal requirements. Like numbers refer to like elements throughout. As used in this specification and the claims, the singular forms "a," "an," and "the" include plural referents unless the context clearly dictates otherwise.

The present disclosure provides processes for isolating, separating, or otherwise extracting various components from a biomass such as a plant material. Beneficially, the processes may be tailored to extraction of specific components or may be generalized to extraction of components based on solubilities, compound type, compound chemical properties, compound physical properties, or the like. In some embodiments, exemplary components for extraction according to processes described herein include, but are not limited to, starches, fibers, pectins, proteins (soluble and insoluble), cell debris, sugars, peptides, alkaloids, and combinations thereof. Such materials may be referred to herein as a "material of interest." In addition, the present disclosure is applicable for large scale production, where the term large scale production refers to processing large quantities of a biomass on a mass production level. The term "biomass" and related terms such as "biomatter" and "plant source" are understood to refer to any portion of a harvested plant that may be processed to extract, separate, or isolate components of interest therefrom. Non-limiting examples of the types of plants that may be processed in accordance with the present disclosure to extract components therefrom include tobacco, corn, rice, grains or other plants recognized as including components desirable for extraction. Further the processing described herein may be carried out in relation to many types of plants or portions of plants such as seeds, flowers, stalks, stems, roots, tubers, leaves or any further portions of a plant.

Exemplary tobacco plant materials used in accordance with the present disclosure may be of some form of a plant of the *Nicotiana* species. The selection of the *Nicotiana* species can vary. In addition, the tobacco plant material subjected to the extraction process described herein can be in various forms, including mature, cured, or green forms. Tobacco plant materials that can be employed include flue-cured or Virginia (e.g., K326), burley, sun-cured (e.g., Indian Kurnool and Oriental tobaccos, including Katerini, Prelip, Komotini, Xanthi and Yambol tobaccos), Maryland, dark, dark-fired, dark air cured (e.g., Passanda, Cubano, Jatin and Bezuki tobaccos), light air cured (e.g., North Wisconsin and Galpao tobaccos), Indian air cured, Red Russian and *Rustica* tobaccos, as well as various other rare or specialty tobaccos. Descriptions of various types of tobaccos, growing practices and harvesting practices are set forth in *Tobacco Production, Chemistry and Technology*, Davis et al. (Eds.) (1999), which is incorporated herein by reference. Various representative other types of plants from the *Nicotiana* species are set forth in Goodspeed, *The Genus Nicotiana*, (Chronica Botanica) (1954); U.S. Pat. No. 4,660,577 to Sensabaugh, Jr. et al.; U.S. Pat. No. 5,387,416 to White et al. and U.S. Pat. No. 7,025,066 to Lawson et al.; US Patent Appl. Pub. Nos. 2006/0037623 to Lawrence, Jr. and 2008/0245377 to Marshall et al.; each of which is incorporated herein by reference. Exemplary *Nicotiana* species include *N. tabacum, N. rustica, N. alata, N. arentsii, N. excelsior, N. forgetiana, N. glauca, N. glutinosa, N. gossei, N. kawakamii, N. knightiana, N. langsdorffi, N. otophora, N. setchelli, N. sylvestris, N. tomentosa, N. tomentosiformis, N. undulata, N.×sanderae, N. africana, N. amplexicaulis, N. benavidesii, N. bonariensis, N. debneyi, N. longiflora, N. maritina, N. megalosiphon, N. occidentalis, N. paniculata, N. plumbaginifolia, N. raimondii, N. rosulata, N. simulans, N. stocktonii, N. suaveolens, N. umbratica, N. velutina, N. wigandioides, N. acaulis, N. acuminata, N. attenuata, N. benthamiana, N. cavicola, N. clevelandii, N. cordifolia, N. corymbosa, N. fragrans, N. goodspeedii, N. linearis, N. miersii, N. nudicaulis, N. obtusifolia, N. occidentalis* subsp. *Hersperis, N. pauciflora, N. petunioides, N. quadrivalvis, N. repanda, N. rotundifolia, N. solanifolia*, and *N. spegazzinii.*

*Nicotiana* species can be derived using genetic-modification or crossbreeding techniques (e.g., tobacco plants can be genetically engineered or crossbred to increase or decrease production of components, characteristics or attributes). See, for example, the types of genetic modifications of plants set forth in U.S. Pat. No. 5,539,093 to Fitzmaurice et al.; U.S. Pat. No. 5,668,295 to Wahab et al.; U.S. Pat. No. 5,705,624 to Fitzmaurice et al.; U.S. Pat. No. 5,844,119 to Weigl; U.S. Pat. No. 6,730,832 to Dominguez et al.; U.S. Pat. No. 7,173,170 to Liu et al.; U.S. Pat. No. 7,208,659 to Colliver et al. and U.S. Pat. No. 7,230,160 to Benning et al.; US Patent Appl. Pub. No. 2006/0236434 to Conkling et al.; and PCT WO 2008/103935 to Nielsen et al.

At least a portion of the tobacco plant material of the *Nicotiana* species can be processed in an immature form. That is, the plant, or at least one portion of that plant, can be harvested before reaching a stage normally regarded as ripe or mature. As such, for example, tobacco can be harvested when the tobacco plant is at the point of a sprout, is commencing leaf formation, is commencing flowering, or the like.

At least a portion of the tobacco plant material of the *Nicotiana* species can be processed in a mature form. That is, the plant, or at least one portion of that plant, can be harvested when that plant (or plant portion) reaches a point that is traditionally viewed as being ripe, over-ripe or mature. As such, for example, through the use of tobacco harvesting techniques conventionally employed by farmers, Oriental tobacco plants can be harvested, burley tobacco plants can be harvested, or Virginia tobacco leaves can be harvested or primed by stalk position.

After harvest, the plant of the *Nicotiana* species, or portion thereof, can be processed in a green form (e.g., tobacco can be used without being subjected to any curing process). For example, tobacco in green form can be frozen, subjected to irradiation, yellowed, dried, cooked (e.g., roasted, fried or boiled), or otherwise subjected to storage or treatment for later use. Such tobacco also can be subjected to aging conditions.

Figure 1:
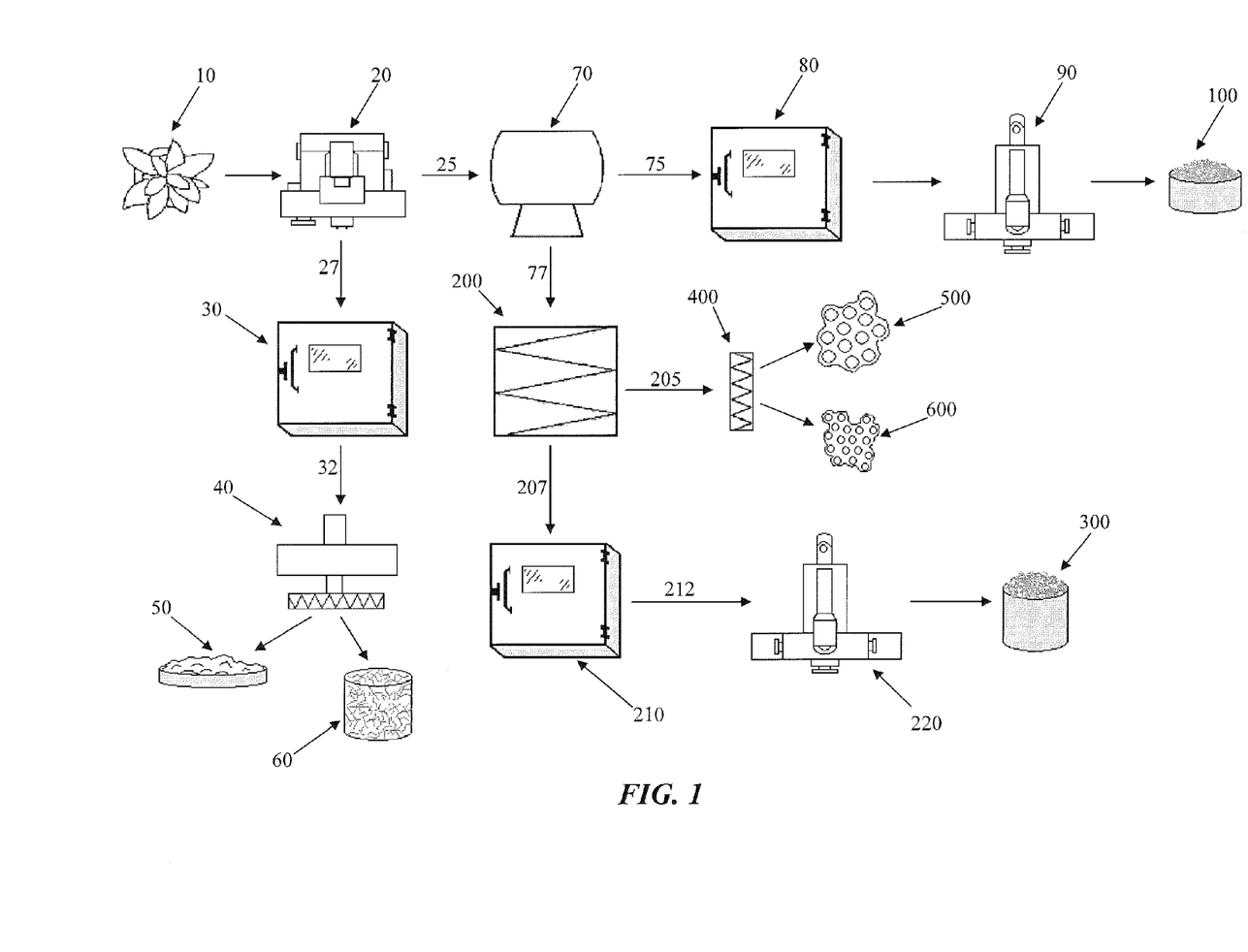
FIG. 1 is a schematic view of a separation process according to one embodiment of the invention for extracting at least one component of a plant material and thus providing a plant-derived component.

An illustration of a set of processing steps that can be carried out to extract one or more plant-derived components according to certain embodiments of the invention is presented in FIG. 1. These steps may be carried out in relation to any plant material, and particularly a tobacco plant material. The specific sequence of steps shown in FIG. 1 should not to be construed as limiting the invention. Any modifications to the present disclosure which are functionally equivalent to the procedures and conditions disclosed herein are within the scope of the instant invention. Further, it should be understood that the various devices and apparatus utilized in the process of the present disclosure may be utilized in a variety of processing operations, not just the steps depicted in FIG. 1.

The process illustrated in FIG. 1 can be viewed in some embodiments as comprising a group of processes that individually can be carried out to isolate or extract specific plant components or types of plant components. The individual processes are linked by one or more initial steps that are carried out to convert the original plant material into a form wherein the individual plant components are freed from the highly specific structure of the original plant material and are thus made available for extraction or isolation when the appropriate processing conditions are provided. Thus, in specific embodiments, the process illustrated in FIG. 1 can be viewed as a single process having multiple process units that can optionally be carried out to extract or isolate the plant material components derivable from specific process steps associated with the specific process unit. The ability of the invention to be characterized as a single process and also a group of individual processes is more evident from the further disclosure provided herein. This characteristic of the invention, however, is a clear advantage over the known art in that the inventive process is non-destructive over a wide spectrum of plant components derivable from the plant material. In specific embodiments, the process can be described as a holistic plant component isolation and extraction process because the individual process steps provide for isolation or extraction of specifically desired plant components in a manner that does not preclude isolation or extraction of any other plant component in the same batch. Thus, all plant components are made accessible by a single process that can utilize specific steps in an optional manner to isolate and extract one or more of the plant components. In other words, groups of one or more types of plant components may be isolated in specific process streams, and the present process provides for accessing the groups in one process stream while maintaining the viability of the groups of plant components that can be accessed in the remaining process streams. More particularly, a portion of the plant components can be extracted via a first process stream, and the remaining portion of the plant components can be extracted via one or more further process streams, wherein extraction of the plant components from the first process stream is completely non-destructive in relation to the plant components in any of the further process streams. In this manner, specific plant components of interest can be extracted in a manner that is non-destructive to the remaining plant components, which can be simultaneously extracted in further process streams or which can be removed from the process in a side stream that may be further processed at a later time or placed into commerce. In particular embodiments, the inventive process can be described as providing for extraction of a plant component selected from the group consisting of plant fibers, plant pectin, insoluble proteins, cell debris, starch, soluble proteins, sugars, peptides, and alkaloid, wherein a portion of the plant components are extracted via a first process stream and the remaining portion of the plant components are extracted via one or more further process streams, and wherein extraction of the plant components from the first process stream is completely non-destructive in relation to the plant components in any of the further process streams.

Figure 2:
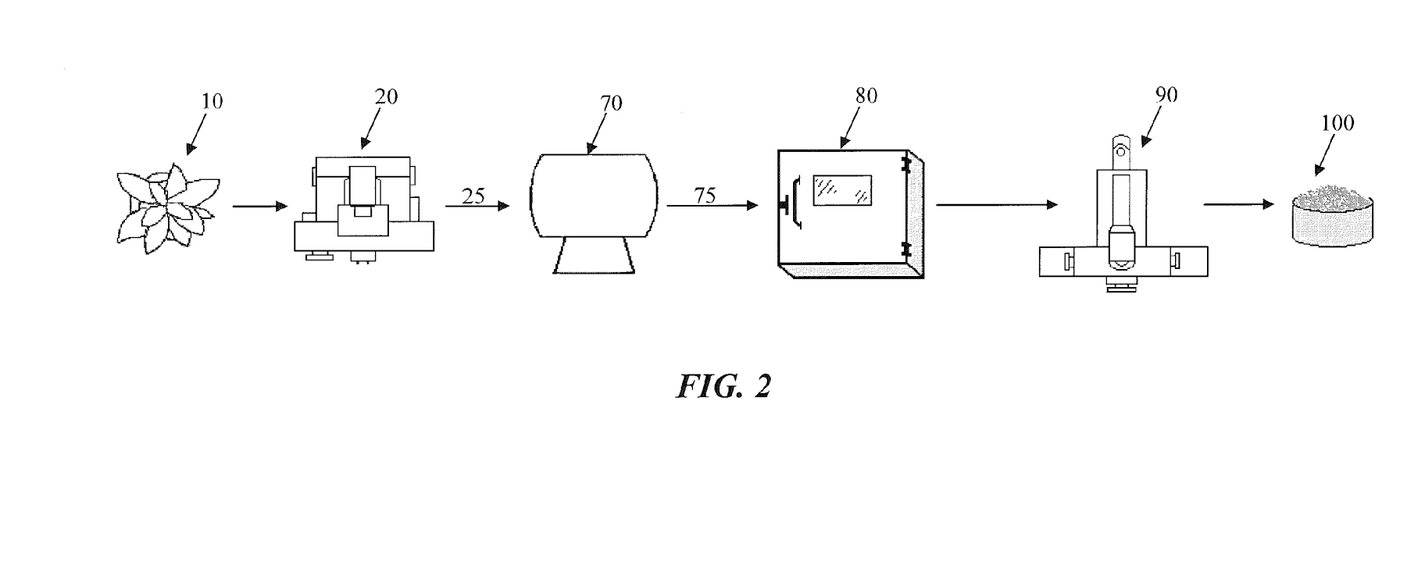
FIG. 2 is a schematic view of a separation process according to one embodiment of the invention for extracting at least a starch component of a plant material.

According to one embodiment, as shown in FIG. 1 and FIG. 2, the inventive process can comprise the step of homogenizing a plant material 10. The terms "homogenize", "homogenizing", and "homogenization" as used herein are understood to refer to any type of processing of a plant material that is effective to break down the plant material and release component parts thereof. Specifically, such terms can refer to any processing that is effective to disrupt or break apart plant cell walls and release fluid and other materials contained within the plant cells. Such processing can include the use of an apparatus, such as a grinder, extruder, hammer mill, colloid mill, French press, or the like. Such homogenizing step can be particularly important for unifying the individual steps used to process specific streams containing specific plant components. In other words, the homogenization step, particularly in relation to the extraction solvent that may be used in the process step, can be a key step for initially converting the plant material from its highly structured original state to the processed state wherein all of the plant components are made accessible in a mutually non-destructive manner.

In the embodiment illustrated in FIG. 1, the invention makes use of a grinder 20, which is effective to homogenize the plant material 10 to form a combination of a plant liquid component, or "green juice", and a plant pulp component. The term "green juice" refers to liquid extracted from processed biomatter according to the present disclosure. However, it should be understood that the term green juice may refer to any liquid extracted from a plant material or biomatter regardless of the extracted liquid's color.

In specific embodiments, the grinding apparatus 20 may comprise a knives and hammer configuration for disintegrating, mutilating, chopping, pulverizing, or otherwise grinding the plant material 10 to extract the green juice from the remaining plant pulp material. That is, the grinding apparatus 20 ruptures the cell walls of the plant material 10 so as to release the green juice therefrom. A representative grinding apparatus is disclosed in U.S. Pat. No. 6,906,172 to Bratcher et al., which is incorporated herein by reference in its entirety. A screening arrangement may be provided to separate the green juice from the pulp material. Although a grinder 20 is illustrated, it is understood that any apparatus useful for achieving homogenization of the plant material may be used.

The homogenizing or grinding step may be performed in the presence of an extraction solvent. In this regard, the plant material may be subjected to a combined grinding and extraction process that subjects the plant material to a grinding action and simultaneously contacts the plant material with the extraction solvent. The plant material may be combined with the extraction solvent prior to, during, or after grinding. In some embodiments, the extraction solvent may comprise a buffer solution that can be particularly useful to maintain or otherwise adjust the pH of the plant liquid component during the homogenizing step to a predetermined constant level. Because of the intimate mixing occurring during homogenization in the presence of the extraction solvent, it is understood that the plant liquid component can comprise not only the liquid components from the plant material but also some amount of the extraction solvent.

According to some embodiments, the pH of the plant liquid component may be adjusted so as to maximize the amount of a specific plant component (e.g., protein, starch, sugar, or alkaloid) in the extracted green juice. For example, it may be useful to maintain the pH in the range of about 6.5 to about 8.0. Such range specifically can be useful in relation to embodiments wherein it is desirable to maximize the starch content of the green juice. In particular embodiments, such as where the plant material comprises a tobacco plant material, the pH may be maintained at about 6.8 to about 7.6, particularly about 7.0 to about 7.4, and more particularly about 7.2. When isolation of plant components other than starch is desired, significantly different pH ranges may be used. For example, in some embodiments, it may be useful to maintain the pH in the range of about 5 to about 7, about 5.2 to about 6.8, or about 5.5 to about 6.5. In other embodiments, it may be useful to maintain the pH in the range of about 8 to about 10, about 8.2 to about 9.8, or about 8.5 to about 9.5. The buffer solution specifically can comprise components useful to achieve such pH ranges. In specific embodiments, the pH may be maintained at a substantially neutral pH. Based upon the present disclosure, different and/or overlapping pH ranges may be useful for maximizing the content of different plant components in the green juice, and such further pH ranges likewise would be encompassed by the present invention in particular embodiments. Of course, the inclusion of such further pH ranges should not be viewed as limiting the scope of the present disclosure in relation to starch extraction in particular.

The extraction solvent preferably can be combined with the plant material in specific ratios to achieve extraction of the desired components. In some embodiments, the extraction solvent and the plant material may be combined at a ratio of about 0.1 L to about 5 L of extraction solvent per 1 kg of biomass. In other embodiments, the ratio may be about 0.1 L to about 4 L, about 0.1 to about 3 L, about 0.1 to about 2 L, about 0.1 to about 1 L, about 0.2 L to about 0.8 L, about 0.3 L to about 0.7 L, or about 0.4 L to about 0.6 L of extraction solvent per 1 kg of biomass. In further embodiments, the process may use at least about 0.1 L, at least about 0.2 L, at least about 0.3 L, or at least about 0.4 L of extraction solvent per 1 kg of biomass. In one embodiment, the process can comprise combining about 0.5 L of extraction solvent per 1 kg or biomass.

The extraction solvent may include a variety of compounds useful to facilitate extraction of one or more specific components from the plant material. In some embodiments, the extraction solvent may comprise one or more materials selected from the group consisting of detergents, surfactants, antioxidants, amino acids, buffers, protein extraction agents, and combinations thereof. Useful detergents may comprise any material effective to compromise, degrade, or otherwise break apart cell membranes. Non-limiting exemplary embodiments of useful detergents include sodium dodecyl sulfate, sodium dodecyl sulfate-lauryl, octyl-beta-glucoside, octyl-beta-thioglucopyranoside, sodium cholate, sodium deoxycholate, 3-[(3-cholamidopropyl)dimethylammonio]-1-propanesulfonate ("CHAPS"), 3-[(3-cholamidopropyl)dimethylammonio]-2-hydroxy-1-propanesulfonate ("CHAPSO"), and octophenol ethoxylates, such as the TRITON™ X series of detergents. In further embodiments, the detergents may be selected from the group consisting of nonionic detergents, zwitterionic detergents, and ionic detergents. Nonionic and zwitterionic detergents may be useful when it is desirable to limit protein denaturation upon cell lysis. Ionic detergents may be useful when it is desirable to provide strong solubilizing properties and/or denature proteins present in the plant material.

Useful surfactants can comprise any material effective to participate in compromising, degrading, or otherwise breaking apart cell membranes. In some embodiments, useful surfactants include, for example, nonionic surfactants, cationic surfactants, anionic surfactants, and amphoteric surfactants. Non-limiting examples of specific surfactants that may be useful include fatty acid alkanolamides, polyoxyethylene ("POE") alkyl phenyl ether-based surfactants, POE alkyl ether-based surfactants (such as POE decyl ether, POE lauryl ether, POE tridecyl ether, POE alkylenedecyl ether, POE sorbitan monolaurate, POE sorbitan monooleate, POE sorbitan monostearate, tetraoleic polyoxyethylene sorbitan, POE alkyl amine, and POE acetylene glycol), cetyl trimethyl ammonium bromide, dodecyl trimethyl ammonium chloride, tetradecyl trimethyl ammonium chloride, and cetyl pyridinium chloride.

Useful antioxidants can comprise any material effective to reduce or prevent oxidation of green juice components during processing. Non-limiting examples of useful antioxidants include thiols, polyphenols, bisulfites, metabisulfites, ascorbic acid, salts of ascorbic acid, uric acid, salts of uric acid, glutathione, tocopherols, tocotrienols, propyl gallate, tertiary butylhydroquinone, butylated hydroxyanisole, and butylated hydroxytoluene.

In specific embodiments, the extraction solvent may comprise one or more salts of phosphoric acid. Such salts of phosphoric acid may be particularly effective as buffer materials. In further embodiments, the extraction solvent may comprise one or more bisulfite or metabisulfite containing compounds. In further embodiments, the extraction solvent may comprise one or more Group I or Group II halide salts, which may be particularly useful protein extraction agents. In specific embodiments, the extraction solvent particularly may include an antioxidant compound, such as sodium metabisulfite ($Na_2S_2O_5$), sodium bisulfate, or ascorbic acid. When the extraction solvent functions as a buffer solution, it can be useful for the extraction solvent to include one or more neutralizing agents such as, for example, sodium phosphate. In particularly useful embodiments, the extraction solvent may comprise at least one salt of phosphoric acid and at least one bisulfite or metabisulfite compound. In further useful embodiments, the extraction solvent may comprise at least one salt of phosphoric acid, at least one bisulfite or metabisulfite compound, and at least one Group I or Group II halide salt. In specific embodiments, the extraction solvent may comprise one or more compounds selected from the group consisting of dibasic sodium phosphate heptahydrate, monobasic sodium phosphate monohydrate, sodium chloride, potassium chloride, sodium bisulfite, sodium metabisulfite, ascorbic acid, and combinations thereof. An exemplary extraction solvent may comprise a solution of about 20 mM sodium phosphate, about 500 mM NaCl, and about 0.125 percent sodium metabisulfite at a pH of about 7.2. In another embodiment, the extraction solvent can comprise about 3.2 g/L dibasic sodium phosphate heptahydrate, about 1.11 g/L monobasic sodium phosphate monohydrate, about 29.22 g/L sodium chloride, and about 1.25 g/L sodium metabisulfite at a pH of about 7.16. In other instances, the extraction solvent may comprise a phosphate buffered saline (PBS). Any suitable extraction solvent may be used to maintain the pH of the plant liquid component at a predetermined constant level, such as in the ranges described above. Those skilled in the art will appreciate that pH may be adjusted using many suitable acids or bases well known in the art.

After homogenization has been carried out, the plant liquid component (e.g., green juice) 25 can be withdrawn or otherwise separated from the plant pulp component 27, which can contain primarily plant fiber (or cellulose) and pectin. Pectin is a structural heteropolysaccharide contained in the primary cell walls of terrestrial plants. Pectin may be used in food as a gelling agent, thickening agent and stabilizer in food. It may also be used as a source of dietary fiber.

Figure 3:
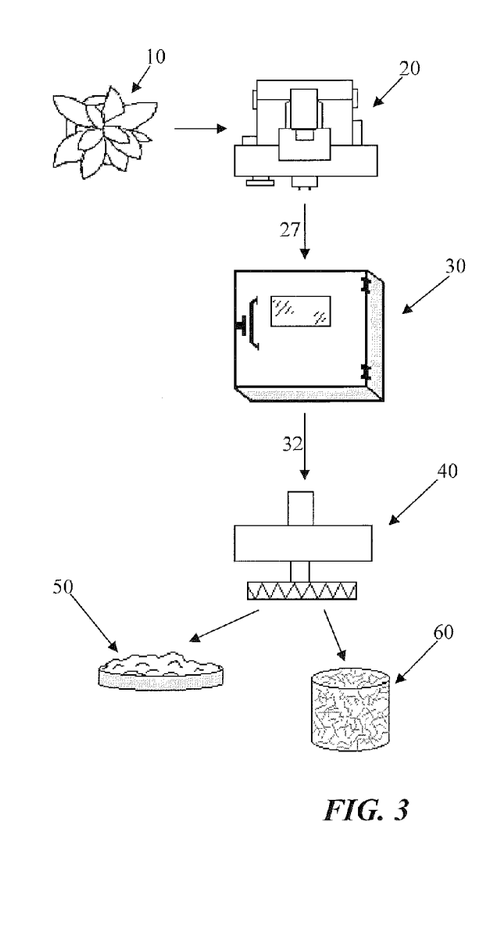
FIG. 3 is a schematic view of a separation process according to one embodiment of the invention for extracting at least a fiber component of a plant material.

As shown in FIG. 3, the plant pulp component 27 can be dried by directing it into a suitable drying apparatus, such as the oven 30 illustrated in this embodiment. Preferably, the plant pulp component 27 is dried to a desired level of moisture content such as, for example, less than about 20% by weight, less than about 15% by weight, or less than about 10% by weight.

The dried plant pulp component 32 can be directed to a suitable apparatus for extracting one or more component therefrom. For example, the dried plant pulp component 32 can be directed to a pectin extraction apparatus 40 for extracting a pectin component 50 from the dried plant pulp component 32. Such apparatus 40 likewise can be suitable for providing a fiber residue 60 comprising the remaining plant fiber or cellulose material. In one embodiment, the pectin extraction apparatus 40 can include a suitable vessel for contacting the dried plant pulp component 32 with an extraction buffer. For example, the extraction buffer may contain a solution of about 10% acetic acid and about 10 mM ethylenediaminetetraacetic acid (EDTA). In some embodiments, the extraction buffer may be added to the dried plant pulp component at about a 15:1 buffer:tissue ratio. The mixture of the pulp and extraction buffer may be heated and then allowed to cool to room temperature. The cooled mixture may then be filtered to remove the fiber residue 60, which may be further dried. The extract with the pectin therein may be combined with an alcohol solution, such as 100% ethanol, at a ratio of, for example, 1:1. The ethanol extracted material may then be allowed to sit at room temperature so as to form a gelatinous (gel) layer. The gel layer may be removed (e.g., scraped off) and strained through an appropriate straining medium, such as, for example, Whatman paper, using a Buchner funnel and a vacuum pump. Residual solids on the straining medium may be washed with, for example, ethanol and then allowed to dry. In one instance, the washed solids may be placed into a glass scintillation vial for drying. The resultant pectin material may have a jelly-like appearance prior to drying. As such, the pectin and fiber materials are separated for appropriate use.

Returning to FIG. 1 and FIG. 2, the plant liquid component 25 can be directed to a separating apparatus, such as the centrifuge 70 in the illustrated embodiments. Specifically, the separating apparatus may be a decanter centrifuge (e.g., an Alfa Laval NX-409 decanter), which can be used to extract solid materials from liquids when such components are mixed together in a slurry. Thus, the plant liquid component 25 may be characterized as being a slurry, suspension, or solution, depending upon the specific embodiment, which can be determined based upon the type of plant material used, the specific extraction solvent used, and the component desired for isolation. The plant liquid component 25 can be centrifuged to further separate the material into a soluble liquid fraction 77 and a solids fraction 75 using the decanter centrifuge apparatus 70 or any other suitable centrifuge system, such as, for example, a basket type centrifuge system or a batch type centrifuge system. Representative centrifuge systems are described in, for example, U.S. Pat. No. 6,817,970 to Berit et al., U.S. Pat. No. 5,899,845 to Kohlstette et al., U.S. Pat. No. 5,267,937 to Zettier et al., U.S. Pat. No. 4,966,576 to Schulz et al., and U.S. Pat. No. 5,865,719 to Droste et al., each of which is incorporated herein by reference in its entirety. Suitable conditions for centrifugation may be based, for example, upon time interval, feed rate, dwell time for expulsion of solid pellet material, operation speed, and G-force.

According to certain embodiments, the plant liquid component can be continuously fed into the separating apparatus (e.g., a decanter centrifuge apparatus). More specifically, the plant liquid component can be supplied to the decanter centrifuge apparatus 70 (or similar apparatus) at a feed flow rate of about 5 to about 25 L/min, about 10 to about 20 L/min, or about 12 to about 17 L/min. In one embodiment, the feed rate can be about 15 L/min. Time interval and dwell time for the centrifugation process can be inversely proportional to the feed flow rate. Thus, the process can be characterized in that one or both of time interval and dwell time for centrifugation can be increased proportionally to any decrease in feed flow rate. Likewise, one or both of time interval and dwell time for centrifugation can be decreased proportionally to any increase in feed flow rate.

Operation speed and applied force in the centrifuge process can relate to the bowl size of the apparatus. For example, suitable centrifuges may have a bowl size of about 8 inches (20.3 cm) to about 36 inches (91.4 cm), about 10 inches (25.4 cm) to about 30 inches (76.2 cm), or about 12 inches (30.5 cm) to about 24 inches (61 cm). In some embodiments, the decanter centrifuge apparatus 70 may operate in the range of about 1,000 rpm to about 6,000 rpm, about 2,000 rpm to about 6,000 rpm, about 3,000 rpm to about 6,000 rpm, about 4,000 rpm to about 6,000 rpm, about 4,200 rpm to about 5,600 rpm, 4,400 rpm to about 5,400 rpm, or about 4,600 rpm to about 5,200 rpm. In specific embodiments, a combination of bowl size and operating speed can be used to achieve an applied force of about 750×g (or 750 time the force of gravity) to about 2,500×g, about 1,000×g to about 2,000×g, or about 1,100×g to about 1,900×g. Operation using parameters as described above can be critical to achieving a desired concentration of the desired plant component, such as starch, in the insoluble fraction. For example, operation at an applied force greater than discussed above may result in a decreased purity starch product. The recovered solids (insoluble) fraction can be in the form of a semi-solid, a slurry, or a paste.

The solids content in the plant liquid component 25 again can vary depending upon the factors noted above. In some embodiments, the solids content of the plant liquid component 25 can be up to about 15%, up to about 12%, up to about 10%, or up to about 8%. In further embodiments, the solids content can be about 0.5% to about 15%, about 1% to about 10%, about 2% to about 8%, or about 3% to about 6%, based upon the total weight of the plant liquid component 25. Alternatively, a filtration system or arrangement may be used to separate the soluble liquid fraction 77 and the solids fraction 75 from the plant liquid component 25 to reduce costs associated with the process by eliminating the decanter centrifuge apparatus 70. In other embodiments, separation of the soluble and solids fractions also may occur via ceramic microfiltration, such as using a filter size of 0.5 µm or less, 0.4 µm or less, 0.3 µm or less, 0.2 µm or less, or 0.1 µm or less. Such separation of the soluble fraction and the insoluble fraction can be critical to achieving a desired concentration of desired plant components (e.g., starch) in the insoluble fraction.

Accordingly, in some embodiments, a primary material of interest in the solids (insoluble) fraction 75 of the plant liquid component 25 may be a starch component. In this regard, granules, particles, or pellets of the starch component may be suspended in the green juice. As such, centrifugation of the green juice, as otherwise described above, may be useful to isolate the starch component or other solids in suspension from the green juice. The soluble liquid fraction 77 produced in this step can contain soluble proteins, sugars, and other compound that can be recovered if desired through further processing, as further described herein.

The solids fraction 75 may be dried using, for example, an industrial oven 80, as illustrated. In other embodiments, the inventive process may make use of a vortex dryer, flash drying technology, spray drying, or any other suitable drying process. Drying in an oven 80 may be carried at a temperature greater than room temperature, such as up to about 90° C., up to about 80° C., or up to about 70° C. In some embodiments, drying may be at a temperature of about 40° C. to about 90° C., about 50° C. to about 80° C., or about 60° C. to about 70° C. The solids fraction 75 may be dried to a desired moisture content such as, for example, less than about 20% by weight, less than about 15% by weight, or less than about 10% by weight. The dried solids fraction 85 may then be ground, milled or otherwise pulverized using a milling apparatus 90 to provide a powder or granular material 100. The composition of the powder or granular material 100 can vary depending upon the plant material used, the extraction solvent used, and the desired component to be isolated. In some embodiments, it may be desirable for the plant material to comprise a tobacco plant material and for the powder or granular material 100 to comprise a component useful as an ingredient in a smokeless tobacco composition or product.

In specific embodiments, it may be desirable to isolate a starch material—i.e., a compound comprising one or more polysaccharides containing multiple monosaccharide units. In particular, the plant-derived starch can be a polymer containing a plurality of glucose molecules connected by hydrolysable alpha linkages (i.e., alpha-1,4-glucosidic linkages). The number average molecular weight of the starch component can vary, but typically can be up to about 50,000 Da, up to about 40,000 Da, up to about 30,000 Da, or up to about 20,000 Da. In other embodiments, the number average molecular weight of the starch can be about 500 Da to about 30,000 Da, about 1,000 Da to about 20,000 Da, or about 2,000 Da to about 10,000 Da.

In some embodiments, the solids fraction 75 after centrifugation or other separation can comprise at least about 40% by weight of starch on a dry weight basis. In further embodiments, at least about 50% by weight, at least about 60% by weight, or at least about 70% by weight of the solids fraction 75 on a dry weight basis is a plant-derived starch component. In yet further embodiments, the solids fraction 75 can comprise about 40% to about 95%, about 50% to about 90%, or about 60% to about 85% by weight of a plant-derived starch component on a dry weight basis.

The dried solids fraction 85 may be milled to achieve a desired particle size. Specifically, the resultant powder or granular material 100 can have an average particle size of less than about 1 mm, less than about 500 µm, less than about 100 µm, or less than about 50 µm. In further embodiments, the powder or granular material 100 can have an average particle size of about 1 µm to about 1 mm, about 1 µm to about 100 µm, about 5 µm to about 75 µm, about 5 µm to about 50 µm, about 5 µm to about 25 µm, about 10 µm to about 900 µm, about 100 µm to about 750 µm, or about 100 µm to about 500 µm.

In some embodiments, it may be useful to extract or otherwise isolate the starch material from the dried solids fraction 85 or the powder or granular material 100. For example, it may be useful to subject the materials to a wash process. According to one embodiment, such wash process can comprise combining the plant derived starch (e.g., the dried solids fraction 85 or the powder or granular material 100) with a suitable solvent liquid mixture (e.g., an alcohol, such as 95% ethanol) in a suitable vessel. The mixture then can be optionally agitated and heated, preferably to the boiling point of the mixture, for a suitable period of time (e.g., at least about 10 minutes). The heated mixture may be stirred to ensure even heating thereof. The heated mixture can be filtered using a filter system (e.g., Buckner funnel filter, vacuum hose, vacuum line, and flask). The washed solids are filtered and collected in the Buckner funnel filter. The filtered solids are then subjected to a second wash procedure if desired (repeat wash procedure). After the optional second wash, the filtered solids can be transported to a glass drying dish and placed under a hood for drying—e.g., for about 16 to 24 hours. The resultant material can be a substantially pure starch component, which may be irradiated if desired. Such starch material may be referred to as a plant-derived starch material, and specifically a tobacco-derived starch material.

In one aspect of the invention, such as where the dried material is derived from a tobacco plant material, the resultant particulate material may be used as a tobacco-derived binder. Thus, the invention can provide a tobacco-derived binder that can comprise a tobacco-derived starch material. The use of a binder containing tobacco-derived starch material is advantageous because such materials represent a natural product providing useful adhesive properties that enhance product cohesiveness, and also provides compatibility with the other sources of tobacco in the product from an organoleptic standpoint.

In some instances, the tobacco-derived binder can be a starch-enriched tobacco extract that contains tobacco-derived starch as the predominant ingredient, and which may contain other tobacco-derived components such as dietary fiber, protein, moisture, ash, and other sugar components. The relative amounts of the components forming the tobacco-derived binder may vary. In particular embodiments, the tobacco-derived starch component can comprise at least about 25 dry weight percent, at least about 30 dry weight percent, at least about 35 dry weight percent, at least about 40 dry weight percent, or at least about 40 dry weight percent of the tobacco-derived binder, based on the total weight of the binder. In other embodiments, the tobacco-derived starch component can comprise about 25 to about 75, about 30 to about 70, about 40 to about 60, or about 45 to about 55 dry weight percent, based on the total weight, of the tobacco-derived binder. A typical range of the dietary fiber component within the tobacco-derived binder can be at least about 10 dry weight percent or, more particularly, about 10 to about 20 dry weight percent. A typical range of the protein component within the tobacco-derived binder is at least about 5 dry weight percent or, more particularly, about 5 to about 15 dry weight percent. A typical range of the ash component within the tobacco-derived binder is at least about 10 dry weight percent or, more particularly, about 10 to about 15 dry weight percent. A typical range of the sugar component (other than the starch component) within the tobacco-derived binder is at least about 1 dry weight percent or, more particularly, about 1 to about 3 dry weight percent.

Figure 4:
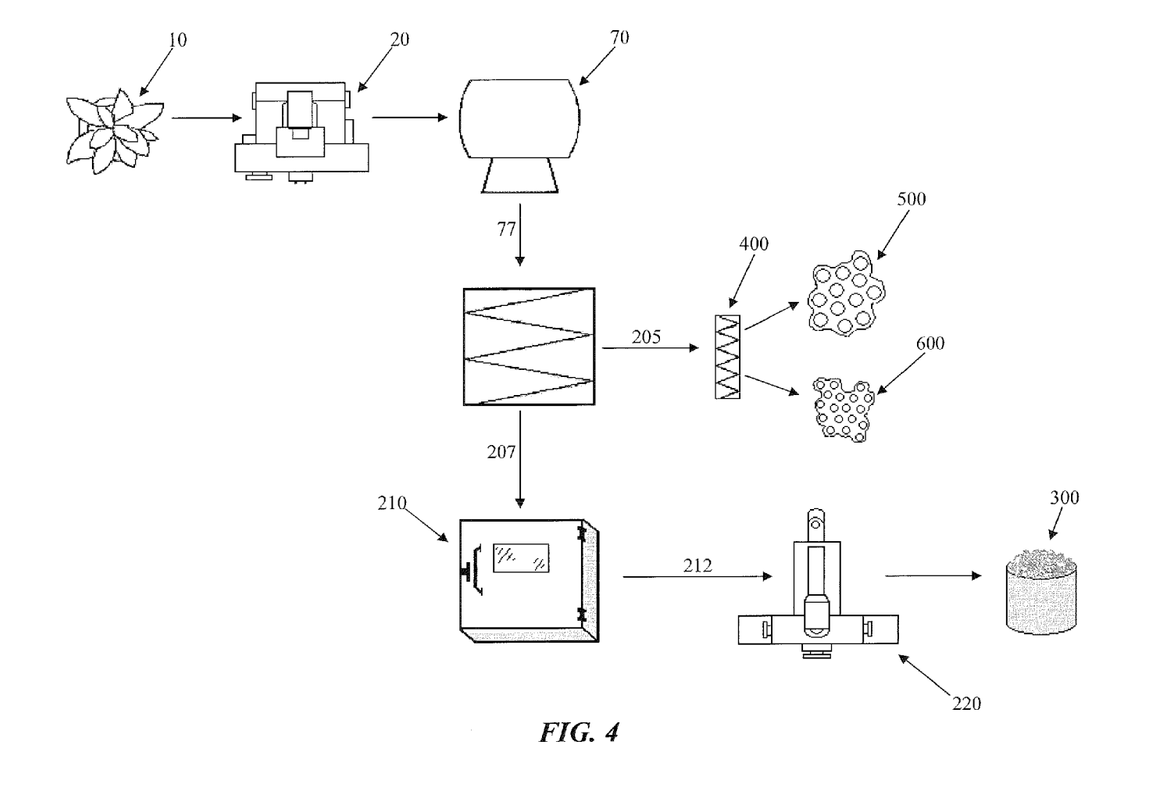
FIG. 4 is a schematic view of a separation process according to one embodiment of the invention for extracting a soluble fraction component of a plant material.

Referring more particularly to FIG. 1 and FIG. 4, the decanter centrifuge apparatus 70 separates the liquid component 25 (or green juice) into the solids fraction 75 and the soluble fraction 77, which may be referred to as a liquid phase or supernatant liquid material. As with the solids fraction 75, the soluble fraction 77 may follow a process path in which specific components can be extracted for desired uses. The soluble fraction 77 may contain components such as, for example, proteins, peptides, sugars, or alkaloids. In some embodiments, it can be useful to adjust the pH of the soluble fraction 77 to facilitate precipitation of specific components therefrom. For example, the pH of the soluble fraction 77 may be adjusted to a value of about 3.5 to about 4.5, about 3.8 to about 4.2, or about 3.9 to about 4.1. In specific embodiments, the pH may be adjusted to be about 4.0. The pH of the soluble fraction may be adjusted by addition of a suitable amount of an acidic or basic material, such as hydrochloric acid, phosphoric acid, or sodium hydroxide. Once the soluble fraction 77 has been pH adjusted, it can be directed to a filtering apparatus 200 to separate the soluble fraction 77 into a liquid permeate component 205 and a concentrate component 207. For example, the filtering apparatus 200 may comprise a ceramic microfiltration system or any other suitable filtration system. In this regard, large molecular weight components may remain in the concentrate component 207 such that the target component of interest can be collected in the concentrates.

In certain embodiments, the filtering apparatus may be configured such that only soluble components smaller than a predetermined size pass through the filter as the liquid permeate component 205, while larger molecules may be retained as the concentrate component 207. The pore size of the filter may be adjusted for various filtering needs, as desired. In specific embodiments, the filtering apparatus 200 can be configured to retain molecules such that the concentrate component 207 comprises particles having a size of greater than about 0.05 µm, greater than about 0.08 µm, greater than about 0.1 µm, or greater than about 0.2 µm. Further, the filtration system may include various modules for providing multiple stages of filtration. In some instances, the filtration system may operate under parameters such as, for example: a ceramic filter membrane less than about 1000 kDa; a pump flow rate of about 450 liters per minute (LPM) to about 550 LPM, and preferably about 510 LPM; a feed pressure of about 20 psi (138 kPa) to about 50 psi (345 kPa); a permeate pressure of about 1 psi (7 kPa) to about 20 psi (138 kPa); and a permeate flow of about 2 LPM to about 8 LPM. Further filtration means suitable for use in the various embodiments of the invention where filtration is desirable include those disclosed in U.S. Pat. No. 4,941,848 to Clapp et al., the disclosure of which is incorporated herein by reference in its entirety.

The concentrate component 207 may be dried using a drying apparatus 210, which can include examples already described herein for drying a material. The concentrate component 207 may be dried to a desired moisture content such as, for example, less than about 20% by weight, less than about 15% by weight, or less than about 10% by weight. The dried concentrate 212 may then be ground, milled, or otherwise pulverized using a milling apparatus 220 to form a powder or granular form 300, which may be used, for example, as an ingredient in a smokeless tobacco composition or product. In certain embodiments, the dried concentrate 212 (and thus the power or granular form thereof 300) may include, for example, an insoluble protein component, a large protein component, a cell debris component, or combinations thereof. In specific embodiments, the dried concentrate 212 may be milled or otherwise ground such that the powder or granular form 300 has an average particle size of less than about 1 mm, less than about 750 µm, or less than about 500 µm.

The liquid permeate 205 material may be further processed to separate the component into a retentate component 500 and an ancillary liquid permeate component 600. Such separation can comprise ultrafiltration, such as using a molecular weight cut-off (MWCO) membrane 400 in the range of about 1-500 kDa, and preferably about 1-100 kDa. Other suitable membrane separation technologies likewise could be employed. The ultrafiltration step results in a substantial further reduction in the process volume. In certain embodiments, the retentate component 500 can comprise soluble proteins, and the ancillary liquid permeate component 600 can comprise sugars, peptides, alkaloids, and amino acids. Additional cycles of ultrafiltration may be conducted, if necessary, to improve the purity of the target material of interest. The choice of MWCO size and ultrafiltration conditions depends on the size of the target material of interest. The ultrafiltration step generally results in a reduction in process volume of about 10- to 30-fold or more and allows diafiltration to further remove undesired molecular species.

In some instances, the ultrafiltration system may operate under parameters such as, for example: a feed pressure of about 30 psi (207 kPa) to about 50 psi (345 kPa), and preferably about 40 psi (276 kPa); a retentate pressure of about 5 psi (34 kPa) to about 15 psi (103 kPa), and preferably about 10 psi (69 kPa); and a transmembrane pressure of about 20 psi (138 kPa) to about 30 psi (207 kPa), and preferably about 25 psi (172 kPa).

It is understood that the microfiltration and ultrafiltration systems described herein are configured to remove particles larger than a predetermined size, depending upon the biomatter being processed by the processing apparatuses of the present disclosure. However, it should be understood that the filtration steps performed by the filtration systems are dependent upon the biomatter being processed and the filters described herein are not limited to the size restrictions mentioned above. For instance, processing of biomatter harvested from corn or rice plants will likely require a different permeability requiring a different type of membrane than processing of a tobacco plant material. Examples of ultrafiltration systems and membranes for ultrafiltration systems are disclosed in U.S. Pat. No. 4,227,999 to Ebner, U.S. Pat. No. 6,106,715 to Thalmann et al., and U.S. Pat. No. 6,120,688 to Daly et al., each of which is incorporated herein by reference in its entirety. Larger or smaller size filters are installable in accordance with the material being processed. Further, in some processing applications of the present disclosure, only one filter may be necessary. In some instances, a plurality of filters may be employed to minimize the possibility of one or the other filters becoming restricted or clogged with matter greater than the determined filtration size.

From ultrafiltration, a final purification or separation of the various components of the ancillary permeate component may be accomplished by processes such as PEG-precipitation, chromatography, precipitation techniques, centrifugation, resuspension, or clarification. For example, proteins or peptides of interest may be purified using standard procedures such as chromatography, salt precipitation, solvent extractions including super critical fluids such as $CO_2$ and other methods known to those of skill in the art. Further, after ultrafiltration the retentate component 500 may be subjected to further processing, such as PEG precipitation or other types of purification to yield the desired product. Such processing is not necessarily automated. For instance, the target material of interest, after separation from other components of the green juice by one or more cycles of centrifugation and filtration, may further be purified by such procedure as PEG-precipitation or purifying proteins and peptides by such procedures as chromatography, including affinity separation, and/or salt precipitation.

Many modifications and other embodiments of the invention will come to mind to one skilled in the art to which this invention pertains having the benefit of the teachings presented in the foregoing description. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A process for extracting a plant-derived component from a tobacco plant material, the process comprising:
   homogenizing the tobacco plant material in the presence of an extraction solvent comprising one or more salts of phosphoric acid and one or more antioxidants to form a combination of a plant liquid component and a plant pulp component such that the plant liquid component is provided with a pH of about 6.5 to about 8.0;
   withdrawing the plant liquid component from the plant pulp component;
   separating the liquid plant component into a solids fraction comprising tobacco plant-derived starch and a soluble fraction;
   drying the solids fraction to a moisture content of less than about 10% by weight; and
   milling the dried solids fraction to provide tobacco plant-derived starch particles having an average particle size of about 50 µm to about 1 mm.

2. The process of claim 1, wherein said homogenizing step comprises grinding the plant material.

3. The process of claim 1, wherein the plant liquid component is provided with a pH of about 7.0 to about 7.4.

4. The process of claim 1, wherein the plant liquid component is provided with a pH of about 7.2.

5. The process of claim 1, wherein the extraction solvent is a buffer solution.

6. The process of claim 1, wherein the extraction solvent further comprises one or more compounds selected from the group consisting of bisulfate containing compounds, metabisulfite containing compounds, Group I and Group II halide salts, and combinations thereof.

7. The process of claim 6, wherein the extraction solvent comprises a compound selected from the group consisting of dibasic sodium phosphate heptahydrate, monobasic sodium phosphate monohydrate, sodium chloride, sodium metabisulfite, and combinations thereof.

8. The process of claim 1, wherein the extraction solvent further comprises a compound selected from the group consisting of detergents, surfactants, amino acids, buffers, protein extraction agents, and combinations thereof.

9. The process of claim 8, wherein the extraction solvent comprises a buffer.

10. The process of claim 9, wherein the extraction solvent further comprises a protein extraction agent.

11. The process of claim 1, wherein the plant material and the extraction solvent are combined in a ratio of about 0.1 L to about 5 L of extraction solvent per 1 kg of plant material.

12. The process of claim 11, wherein the plant material and the extraction solvent are combined in a ratio of about 0.3 L to about 0.7 L of extraction solvent per 1 kg of plant material.

13. The process of claim 1, wherein the milled solids fraction has an average particle size of about 250 µm to about 750 µm.

14. The process of claim 1, further comprising isolating the plant-derived starch from the solids fraction.

15. The process of claim 14, wherein said isolating step comprises:
combining the plant-derived starch with a suitable solvent liquid mixture;
heating the liquid mixture;
filtering the liquid mixture to isolate the plant-derived starch; and
optionally drying the plant-derived starch.

16. The process of claim 15, further comprising irradiating the plant-derived starch.

17. The process of claim 1, wherein said step of separating the liquid plant component into a solids fraction and a soluble fraction comprises centrifuging the liquid component.

18. The process of claim 17, wherein the centrifuging is carried out while the liquid plant component is being continuously fed into the centrifuge.

19. The process of claim 18, wherein the feed flow rate of the liquid plant component into the centrifuge is about 5 to about 25 L/min.

20. The process of claim 17, wherein the centrifuging is carried out under conditions of about 1,000 rpm to about 6,000 rpm.

21. The process of claim 17, wherein the centrifuging is carried out under conditions of about 500×g to about 2,500×g.

22. The process of claim 1, further comprising drying the plant pulp component.

23. The process of claim 22, further comprising extracting from the dried plant pulp component one or more materials selected from the group consisting of pectin, cellulose, and combinations thereof.

24. The process of claim 1, further comprising separating the soluble fraction into a liquid permeate component and a concentrate component.

25. The process of claim 24, wherein said separating comprises filtering the soluble fraction.

26. The process of claim 25, wherein after said filtering, the concentrate component comprises particles from the soluble fraction having a size of greater than about 0.1 microns.

27. The process of claim 26, further comprising drying the concentrate component to form a concentrate solids material.

28. The process of claim 27, further comprising milling the dried concentrate solids material to form a particulate.

29. The process of claim 24, wherein the concentrate component comprises one or more plant-derived component selected from the group consisting of insoluble proteins, large proteins, cell debris, and combinations thereof.

30. The process of claim 24, further comprising separating the liquid permeate component into a retentate component and an ancillary liquid permeate component.

31. The process of claim 30, wherein the retentate component comprises a soluble proteins component.

32. The process of claim 30, wherein the ancillary liquid permeate component comprises a component selected from the group consisting of sugars, peptides, alkaloids, and combinations thereof.

33. The process of claim 30, wherein said separating step comprises filtering with a 1 kDa ultrafiltration system.

* * * * *